Patented Nov. 7, 1939

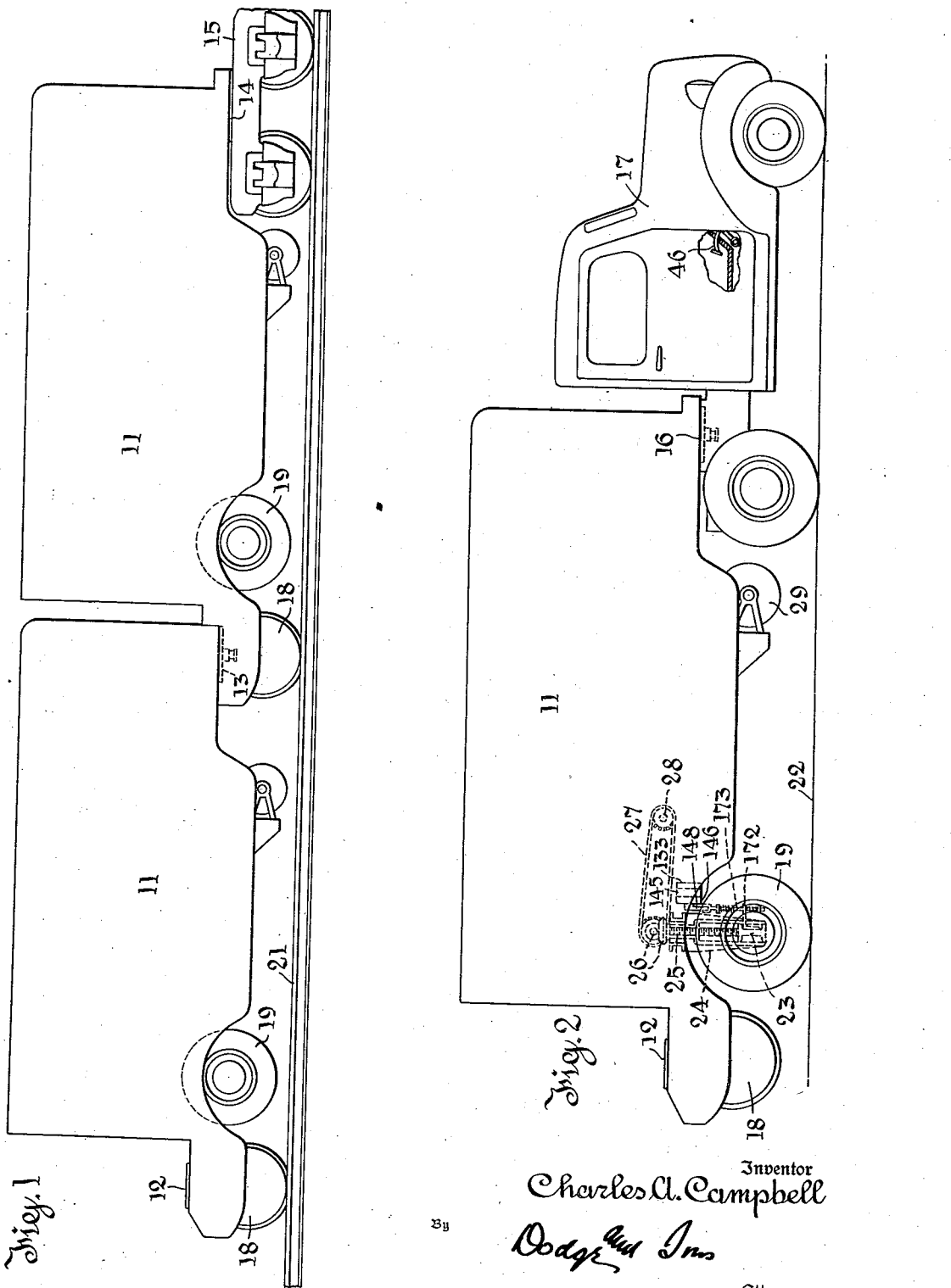
Nov. 7, 1939.  C. A. CAMPBELL  2,178,928
CONVERTIBLE BRAKE CONTROL FOR ROAD-RAIL VEHICLES
Filed Feb. 27, 1939  4 Sheets-Sheet 1
Inventor
Charles A. Campbell
By Dodge and Sons
Attorneys

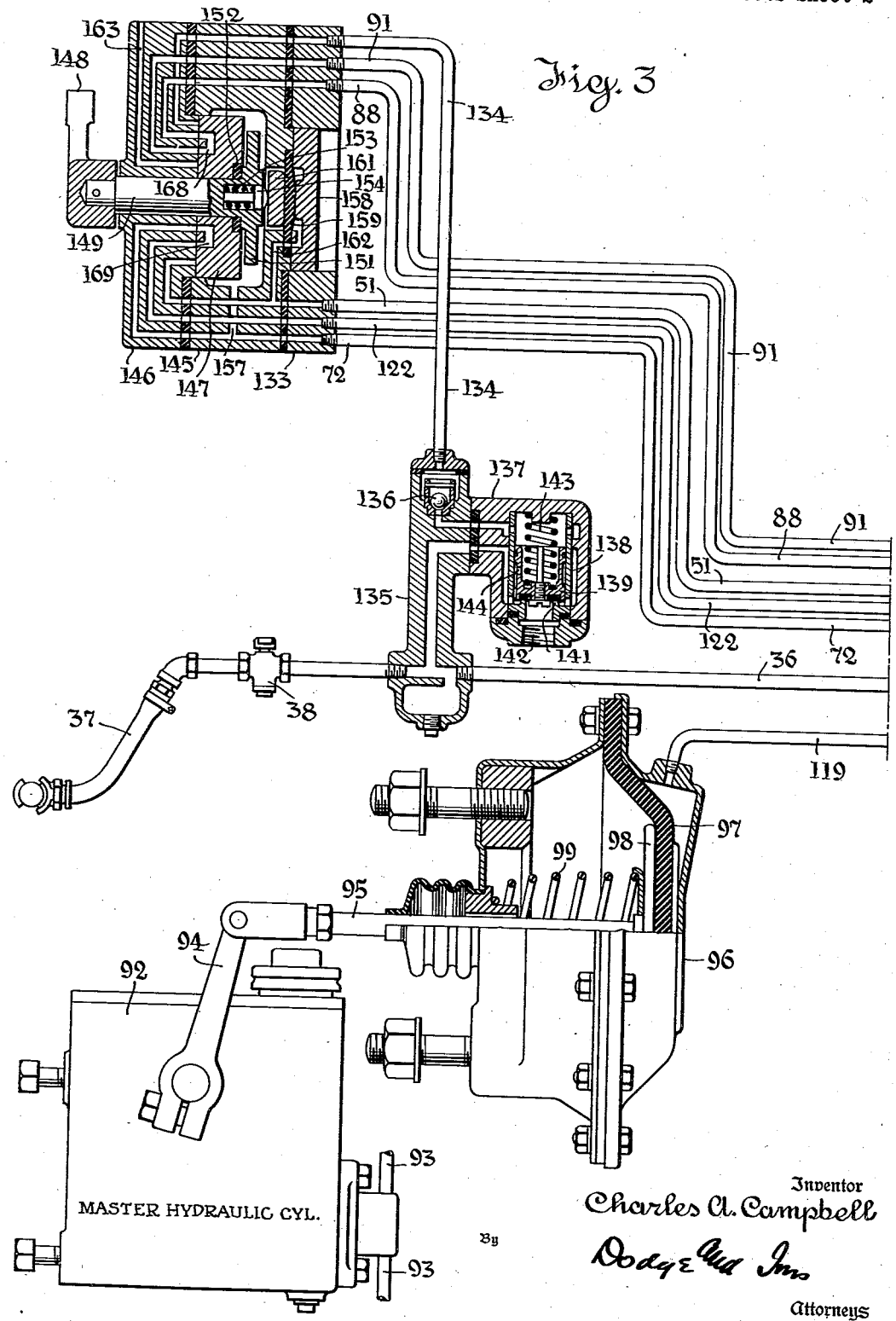

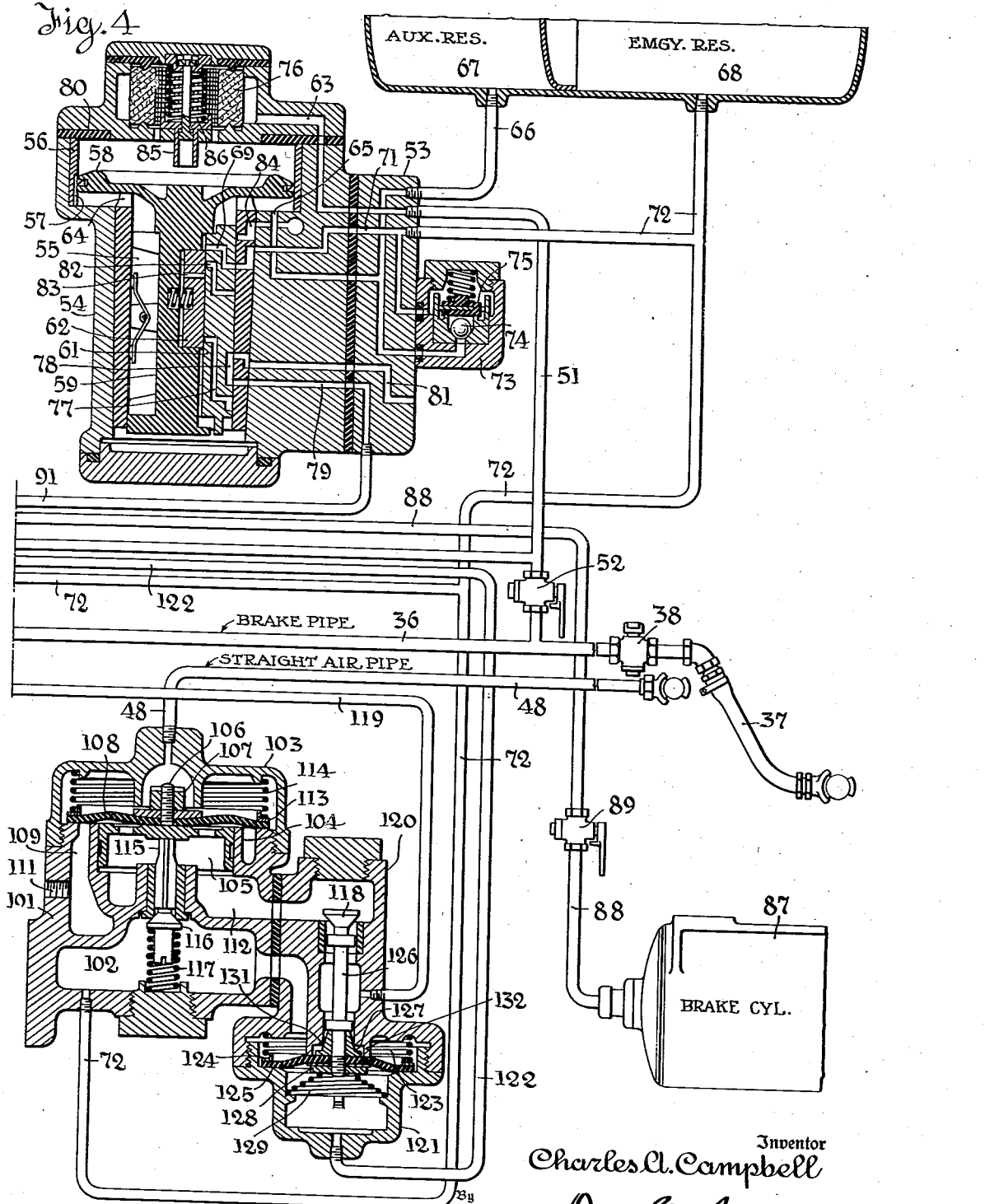

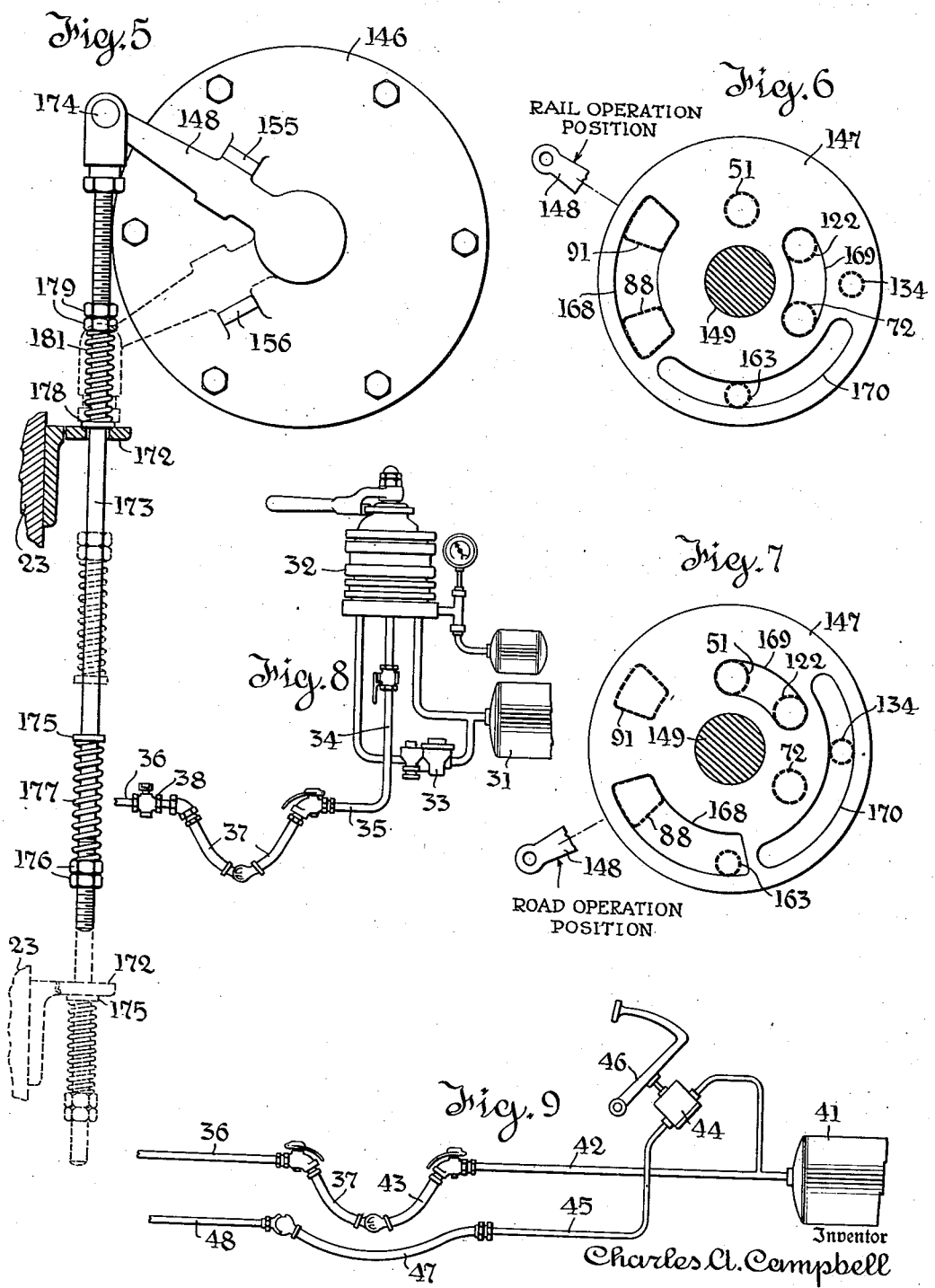

2,178,928

UNITED STATES PATENT OFFICE 2,178,928

CONVERTIBLE BRAKE CONTROL FOR ROAD-RAIL VEHICLES

Charles A. Campbell, Watertown, N. Y., assignor to The New York Air Brake Company, a corporation of New Jersey Application February 27, 1939, Serial No. 258,741

21 Claims. (Cl. 188—3)

This invention relates to air brakes, and particularly to braking mechanism convertible for two distinct classes of service.

Attempts have been made to provide vehicles which can be handled in trains on railroad tracks for long hauls and which, for local delivery, branch service, or other relatively short haul traffic, can be handled individually on roads as trailers or semi-trailers.

For purposes of explanation, one type of such vehicle will be described in general terms hereinafter, but, broadly stated, any such vehicle must be equipped with two types of wheel, one set of wheels being suited for traffic on rails and the other set being suited for traffic on roads.

Where two sets of wheels are provided one set must be retractible so that the two sets may be used alternatively. Various mechanisms for accomplishing this result may be used and the present invention is not concerned with the particular form of any of them.

Vehicles which are to be operated in trains on railroads must be equipped with automatic brakes capable of being controlled by a brake pipe extending from end to end of the train. This is not merely a practical requirement but is a rule imposed by the Interstate Commerce Commission.

Brakes of this automatic type are not, however, well suited for use on automotive vehicles or on trailers drawn by such vehicles. Consequently, it becomes desirable to equip any convertible vehicle of the type mentioned with two brake systems, each of which is suited to a particular class of service.

While these two systems could be wholly independent, it is both simpler and safer to combine the systems in a single unit so far as their diverse operating characteristics may permit, and to provide a selector or change-over mechanism which is operated either by, or synchronously with the shift of the shiftable set of wheels. Consequently the change-over mechanism acts to render operative that one of the two brake systems which is associated with the active set of wheels, the other system being concurrently rendered inoperative.

This, basically, is the principle underlying the present invention. As a safety feature the valve which controls the conversion is so contrived that during the shift from one system to the other it produces an application of the brakes on the active set of wheels if the system is charged. If not, it precludes development of pressure on the brake pipe until the change is completed.

Another feature of the invention is that the automatic brakes which are effective on the rail wheels are not only of the automatic single brake pipe type, but are of a type capable of control by the brake equipment on standard locomotives. Similarly, the brakes on the automotive wheels are preferably applied hydraulically through a master hydraulic cylinder which is operated by a pneumatic motor. This pneumatic motor, which is in effect the brake cylinder, forms part of a two-pipe straight air system. In this system the brake pipe of the automatic system serves during automotive breaking as the reservoir line, the brakes being normally controlled on the straight air principle by pressure variations in the straight air pipe. The automotive system includes an emergency valve which is rendered active by venting of the reservoir line.

In disclosing a device of this sort the drawings would be greatly complicated and the invention more or less obscured if all possible refinements, particularly refinements which have become almost standard in automatic braking, are illustrated.

To avoid this difficulty a very simple type of triple valve has been illustrated. It has a charging and release position, a service position in which it supplies air to the brake cylinder from an auxiliary reservoir, and an emergency position in which it supplies air to the brake cylinder from an auxiliary reservoir and an emergency reservoir. It also includes a release accelerating device effective after an emergency application.

To simplify the showing, quick service venting mechanisms have been omitted as has also an emergency brake pipe venting device. These are mentioned here not because their inclusion involves any matter of invention, but for the purpose of making clear that their omission does not imply that they might not be used in cases where their characteristic functions are desired. They would be useful in various instances but their presence or absence does not affect the invention here claimed. They are omitted to simplify the showing. The necessity of their omission, so far as the present invention is concerned, is expressly negatived.

In the accompanying drawings:

Fig. 1 is a side elevation of two vehicles running on rails to show how the vehicles are connected for train operation. The road wheels are shown elevated so that the brake system is conditioned to operate as a one-pipe automatic system and to be controlled by a locomotive equipped with conventional automatic brake equipment.

Fig. 2 is a similar view showing one of the vehicles of Fig. 1 connected to be drawn by a tractor. In this view the road wheels are forced down to active position, so that the rail wheels are lifted clear and the brake system is conditioned to operate on the automotive two-pipe straight air principle.

Fig. 3 is a view partly in elevation and partly in section, showing the transfer valve, the automotive brake cylinder with its master hydraulic cylinder, and related pipe connections.

Fig. 4 is a view largely in section showing the triple valve with its reservoirs, the brake cylinder of the rail wheel brakes, and the automotive brake valve and related connections.

Note.—Figs. 3 and 4, when assembled from left to right in the order stated, produce a diagram of the complete system for one vehicle.

Fig. 5 is a view of the transfer valve and its operating connections, the valve being shown positioned for rail operation. The position for road operation is indicated in dotted lines.

Fig. 6 is a diagram looking at the seated face of the rotary transfer valve, showing it in rail operating position relatively to its seat. The cavities in the face of the transfer valve are indicated in full lines and the seat ports are indicated in dotted lines.

Fig. 7 is a view similar to Fig. 6 showing road operation position.

Fig. 8 is a diagram of the engineer's brake valve and related parts on a locomotive, showing how they would be connected to the brake equipment of Figs. 3 and 4.

Fig. 9 is a diagram of the main reservoir, foot valve and connections used on an automobile tractor, showing how they would be connected to the mechanism of Figs. 3 and 4.

Referring first to Figs. 1 and 2, 11 represents the body of the vehicle which carries at its rear end a fifth wheel 12 and carries at its forward end a releasable kingpin device 13 capable of engaging with the fifth wheel 12 of a similar vehicle or with the fifth wheel 14 of a bogie truck 15 (see Fig. 1) or with a similar fifth wheel 16 of an automotive four-wheel road tractor 17 (see Fig. 2). At the rear end, under the fifth wheel 12, each vehicle has a pair of flanged rail wheels 18. These are journaled in boxes mounted under springs in ordinary pedestals (not shown).

As clearly indicated in Fig. 1, a series of these vehicles may be arranged to form an articulated train, the forward end of the forward vehicle being supported by a special bogie truck 15 and the truck 15 being drawn by any locomotive such as those in ordinary use on railroads.

Each vehicle has also a pair of rubber-tired road wheels 19 which in Fig. 1, are retracted so that the vehicle is supported by the flanged wheels 18 on the track 21.

In Fig. 2 the road wheels are shown projected downwardly so as to engage the road surface 22 so that the flanged wheels 18 are then held clear of the road. The axle 23 on which the road wheels 19 are mounted is shown guided in pedestals 24 and shiftable by means of screw jacks arranged at opposite ends of the axle, one such screw jack being indicated by the numeral 25 applied to the screw. Bevel gears 26 and chain drive 27 connect the jacks to be actuated in unison by a shaft 28 which may be power or hand driven.

Any wheel shifting or interchanging mechanism may be used so far as the present invention is concerned.

The wheels shown at 29 in a raised or retracted position are so-called parking wheels which may be set to sustain the forward end of the vehicle during coupling operations, as will be obvious.

Rail locomotives customarily have a main reservoir indicated at 31, an engineer's brake valve 32 of the equalizing discharge type connected with the main reservoir directly and also through the feed valve 33. The engineer's brake valve 32 is connected through a branch pipe 34 with the brake pipe 35 on the locomotive. This brake pipe is intended to be connected with a brake pipe extending throughout the train.

With the present system, as indicated in Figs. 3 and 4, this brake pipe is the pipe 36 and the pipe 36 is connected from vehicle to vehicle by flexible hose 37 which have connectors of a type customarily used on railway trains. Cut-out cocks 38 are provided, and when the vehicles are operated in trains these will all be open, except the one at the extreme rear end of the train.

Tractors customarily used to haul trailers and semitrailers have a brake equipment schematically illustrated in Fig. 9. There is a main reservoir 41 charged in any suitable way. This is connected to a reservoir line 42 which has a connecting hose 43 intended for connection with the reservoir line on the trailing vehicle. In the present case it is connected through the hose connection 37 with the pipe 36 already described.

Also connected to the main reservoir 41 is a foot valve 44 which may be any suitable type of straight air brake valve and commonly is of the self-lapping type. Such a brake valve controls the pressure in a straight air pipe 45 and is operated by a pedal 46. When the pedal 46 is at its uppermost position, the pipe 45 is at atmospheric pressure. As the pedal 46 is depressed, the pressure in the pipe 45 rises proportionately to the amount of depression of the pedal. This is a characteristic of such self-lapping valves, and for it no novelty is here claimed.

The pipe 45 carries a flexible hose connector 47 intended for connection with the straight air pipe on the trailing vehicle. The vehicles here under discussion are equipped with a straight air pipe indicated at 48 and having means for the connection of the hose 47 thereto.

For operation in trains on rails, it is desired to use a brake controlling valve device of the automatic type which may and preferably does conform as closely as is reasonably practicable with automatic brake equipments in use today on railroads. Such a device is shown in the upper part of Fig. 4.

Connected to the brake pipe 36 is a branch pipe 51 with normally open cut-out cock 52. The branch pipe 51 leads to a pipe bracket 53 mounted on the vehicle. According to usual practice this pipe bracket offers a mount for the body 54 on the triple valve, and to it are connected all the pipes leading to other valves and to the reservoirs.

In the triple valve body 54 is a slide valve chamber 55 and a communicating cylinder 56 with charging groove 57. The triple piston 58 operates in the cylinder 56 and has a stem 59 which extends into the slide valve chamber. Stem 59 operates a main slide valve 61 which has lost motion with reference to the stem and a graduating valve 62 which is mounted on the back of the slide valve to control ports extending through the slide valve, and which has no lost motion with reference to the stem 59.

This construction conforms to standard practice, and it will suffice to say that the slide valve 61 has lost motion between spaced lugs formed on the stem 59, but the graduating valve is closely received in a notch in the stem. The main slide valve is seated by a bow spring clearly shown in the drawings, and the graduating valve is seated by a coil compression spring reacting between the valve and stem 59 and also shown.

The pipe 51 leads by way of a passage 63 to the space on the outer side of the triple piston 58, and when this piston is in its downward or inner position in which it is arrested by the lugs 64, the charging groove 57 is open so that air from the brake pipe flows past the edge of the piston to the slide valve chamber 55 and thence by way of passage 65 and pipe 66 to the auxiliary reservoir 67.

There is also an emergency reservoir 68, and in the release and charging position of the triple valve this reservoir is charged simultaneously with the auxiliary reservoir through port 69 in the slide valve 61, the port 71 in the slide valve seat and a pipe 72. To simplify the drawing the numeral 72 has been applied to this pipe and branches thereof in free communication with the emergency reservoir. The same practice has been followed as to branches of pipe 51.

Mounted on the pipe bracket 53 is a check valve housing 73 containing a ball check 74 and a lightly spring loaded rubber check valve 75. These permit flow from the auxiliary reservoir passage 65 to a branch of the emergency reservoir port 71. This affords a low resistance auxiliary charging path to the emergency reservoir and is the means for assuring that the triple valve remains in its release position when the rail brake side of the system is inactive and the automotive brake side of the system is operated to produce straight air applications.

The filter 76 is interposed in the path of air flowing between the branch pipe 51 and the cylinder 56.

In addition to the port 69, the slide valve 61 contains an application port 77 controlled by the graduating valve 62 and opened thereby when the piston 58 moves outward relatively to the slide valve 61. There is also an exhaust cavity 78 which, in the inner position of the slide valve 61, connects the brake cylinder port 79 with an atmospheric exhaust port 81.

Slide valve 61 also contains an emergency port 82. When the piston 58 moves outward to the upper limit of motion and seats on the gasket 80, as it does in response to an emergency reduction of brake pipe pressure, the port 82 registers with the port 71 and with a through port 83 in the graduating valve 62, thus supplying emergency reservoir air to the slide valve chamber.

At such time the port 69 in the slide valve 61 registers with an auxiliary exhaust port 84 in its seat, but the port 69 is then blanked by the graduating valve 62. When the piston starts its inward motion in response to a rising brake pipe pressure, the graduating valve exposes the port 69, and by thus venting the slide valve chamber, accelerates the releasing movement. This function occurs only after an emergency application.

It will be obvious that in the emergency position the emergency reservoir air flows by way of pipe 72, port 71, port 82, port 83, to the slide valve chamber, so that emergency reservoir air is then added to auxiliary reservoir air flowing to the brake cylinder port by way of application port 77 and brake cylinder port 79.

The graduating stop 85 with its spring 86 performs the usual functions. As indicated in the drawing, the piston first engages the stop 85 when it has moved for enough to shift port 77 into register with the brake cylinder port 79. It thus resists motion to emergency position.

If brake pipe pressure be reduced at a service rate, the piston 58 moves outward (upward). The graduating valve 62 first exposes port 77 at its inner end and then the valve 61 is picked up and moved until port 77 opens into the brake cylinder port 79. Flow through the brake cylinder port will reduce the auxiliary reservoir pressure and immediately after equalization occurs between this pressure and brake pipe pressure, the triple piston 58 will shift inward (downward) and valve 62 will lap port 77.

If an emergency reduction of brake pipe pressure occurs, the triple valve moves full stroke and seats on the gasket 80. The seat end of the port 77 is elongated and hence still communicates with the brake cylinder port 79. The port 77 is wide open and port 82 registers with ports 71 and 83 so that air from both reservoirs flows to the brake cylinder.

In an automatic emergency the brake pipe is completely vented and upon restoration of pressure in the brake pipe, a point will be reached at which the spring 86 will start to shift the piston 58 inward. Port 69 is then in register with exhaust port 84, and since the initial motion of the piston causes valve 62 to expose the upper end of port 69, the effect is to vent the slide valve chamber to atmosphere and cause a triple piston to move full stroke to release position, after which pressures in the emergency and auxiliary reservoirs equalize, and charging proceeds from the brake pipe through the charging groove 57. In release position the brake cylinder port 79 is connected to the exhaust port 81 by cavity 78.

The triple valve above described will be recognized as a simple form of two-reservoir valve.

The brake cylinder of the rail brakes is shown at 87 and the brake cylinder pipe at 88. There is a cut-out cock 89, but this cock is open at all times unless the cylinder 87 be disabled. The brake cylinder pipe 88 is connected to the brake cylinder port 79 by way of the pipe 91, the connection being controlled by a change-over valve hereinafter described.

The automotive brake system involves a so-called master hydraulic cylinder generally indicated at 92. This is simply an oil displacing pump which forces oil through branch pipes 93 to small hydraulic motors in the hubs of the wheels 19, the hydraulic motors serving to operate brakes on those wheels. Such master cylinders and wheel brakes are so common in the automotive art that they do not require further discussion.

The master hydraulic cylinder is operated through a rock arm 94 and push rod 95 by what is here called a road wheel brake cylinder 96. Instead of the conventional piston the brake cylinder 96 has a flexible diaphragm 97 which reacts against a head 98 on the push rod 95. The coiled compression spring 99 holds the parts in brake releasing position unless the space to the right of the diaphragm be subject to pneumatic pressure. The parts 92 to 98 represent merely what might be called the foundation brake gear of a conventional trailer brake and is a type in every day use on trailers drawn over roads by tractors.

To operate the brake cylinder 96, it is customary to use a brake controlling valve device which, for all ordinary purposes, operates on the straight air principle and which includes, as an auxiliary or stand-by device, an automatic emergency valve to produce an emergency application if the reservoir line to the trailer is vented. This automatic emergency function is to protect the trailer in the case of a break-in-two. In the present device brake pipe 36 serves as the reservoir line for the automotive brake system.

Thus, as shown in Fig. 9, the pipe 36 is connected directly to the reservoir pipe 42 on the tractor, and the straight air pipe 48 on the trailer is connected to the straight air pipe 45 on the tractor which, under release conditions, is vented by the foot valve 44 and which, under brake applying conditions, is under pressures determined by the position of the pedal 46 and valve 44.

The brake controlling valve device for the automotive brake is mounted in a housing 101. This contains a chamber 102 to which a branch of the pipe 72 is connected. Hence the chamber 102 is always in communication with the emergency reservoir 68.

A cap 103 threaded to the housing 101 is in direct communication with the straight air pipe 48. The annular flange 104 formed in the body 101 serves as a guide for a pilot 105 which is vertically movable and which is clamped by the stem 106 and nut 107 to the center of a flexible diaphragm 108. The pilot 105 is apertured as shown and the annular flange 104 lies between an exhaust passage 109 (communicating with the atmosphere at 111) and the chamber 112. The diaphragm 108 is yieldingly clamped at its periphery by a flanged ring 113 and a coil compression spring 114 which reacts between the ring 113 and the cap 103.

The chamber 112 which normally is in communication with the brake cylinder 96 communicates with atmosphere through the pilot 105 over the upper margin of the flange 104, thence via passage 109 and port 111.

If the straight air pipe be under pressure the diaphragm 108 is flattened and seals on the upper margin of the flange 104, thus cutting off the exhaust communication. The pilot 105 engages the fluted stem 115 of a poppet valve 116 which is urged in a seating direction by the coil compression spring 117 and also by emergency reservoir pressure in the chamber 102. Valve 116 controls a passage from the chamber 102 to the chamber 112.

Consequently the development of pressure on the upper face of diaphragm 108 would force the diaphragm down and unseat the valve 116 until the resulting development of pressure in the chamber 112 restores equilibrium of pressures, at which time the valve 116 closes. If, thereafter, the pressure in the straight air pipe 48 be reduced, upward motion of the diaphragm would permit venting of the chamber 112 past the upper edge of the flange 104 until the balance was restored. Thus the pressure in the chamber 112 follows the pressure in the straight air pipe 48 and may be graduated up and down by varying the pressure in the pipe 48.

It has been stated that the chamber 112 is normally in free communication with the brake cylinder 96 to the right of the diaphragm 97, and this communication is by way of the normally open poppet valve 118 and brake cylinder pipe 119. In the event of a break-in-to, the pipes 48 and 36 would both be vented to atmosphere.

The triple valve will immediately move to emergency position and prevent loss of the reservoir charge by flow through brake pipe 36. Some means must be provided to prevent the loss of braking pressure around the edge of diaphragm 108 and thence through pipe 48. That is the function performed by the valve 118. This valve 118 is thus an intercepting valve and is associated with an emergency application valve mounted in the housing 120. The housing 120 is bolted to the housing 101 and has communications with the chambers 112 and 102, as shown. The cap 121 is threaded on the lower end of the housing 119 and communicates by pipe 122 with the change-over valve hereinafter described.

For present purposes, it will suffice to say that when the automotive side of the system is operative, the pipe 122 is connected to the brake pipe 36. Mounted in the cap 121 and seated at its periphery by a spring 123 and flange ring 124 is a flexible diaphragm 125. The stem 126 of valve 118 is connected through a guiding spider and diaphragm clamp 127 with the center of the diaphragm 125. The nut 128 holds the parts in assembled relation and the compression spring 129 biases the assembly in an upward direction, thus normally holding valve 118 open.

The housing 120 is provided with a guideway 131 for the spider 127, and surrounding this is a seat 132 against which the diaphragm normally seals, thus acting as a valve. The outer portion of the diaphragm 125 is subject on its upper side to emergency reservoir pressure communicated from the chamber 102.

Remembering that when the automotive brake is operative, the space below the diaphragm 125 is at the pressure in pipe 36, it will be obvious that during charging, the emergency reservoir 68 can be charged past the margin of diaphragm 125 which may rise against the resistance of spring 123. At such time valve 118 is held open and diaphragm 125 seals against seat 132.

If, when the reservoir 68 is charged, pressure below the diaphragm 125 be reduced, as it would be by rupture of the pipe 36, the diaphragm 125 would be forced downward by emergency reservoir pressure, the valve 118 would close, and the diaphragm 125 would move away from seat 132. The effect would be to disconnect the brake cylinder pipe 119 from the chamber 112 and hence from straight air pipe 48 and connect pipe 119 directly to chamber 102 and consequently with the emergency reservoir 68.

Under such conditions auxiliary reservoir air would be added to that of the emergency reservoir as a result of the opening of the check valves 74 and 75.

From the description so far given, it is obvious that the rail brakes are of the one pipe automatic two-reservoir type; that the automotive brakes are of the two-pipe straight air pipe with a stand-by automatic emergency valve; that the brake pipe 36 is common to both systems, serving as the brake pipe for rail operation and as the reservoir pipe for automotive operation; and finally that the same reservoirs furnish air for both sets of brakes. This is a definite advantage—first, because it reduces the cost and weight of the equipment, and, second, because it permits the conversion from one braking system to the other while the reservoirs are charged. It will also be observed that the triple valve is always connected with the brake pipe, and that the automotive brake cylinder is always connected with its brake controlling valve device.

To convert from one system to another, use is made of a change-over valve which changes certain connections preferably as an incident to the shift of the vehicle supporting wheels.

In the example illustrated, the change-over valve is actually operated by the shift of the wheels. This is the safest scheme because the valve must move if the wheels do. However, the invention is broader than the connection of the valve to the shifting wheel element and any connection or interlock entailing the desired result might be substituted. If automatic shift be not desired, the change-over valve can be arranged for manual actuation.

In the particular embodiment here illustrated, the functions of the change-over valve are relatively simple. So far as the triple valve is concerned, the change-over valve connects the brake cylinder port 79 through its pipe 91 with the brake cylinder pipe 88 for rail operation, and for road operation interrupts this connection and connects the pipe 88 to atmosphere.

So far as the automotive brake is concerned, the function of the change-over valve is to connect the pipe 122 and consequently the space below the diaphragm 125 with the emergency reservoir 68 for rail operation (thus rendering the diaphragm 125 inert during rail operation by balancing the pressures on its opposite faces). For road operation the change-over valve pipe 122 is connected with the brake pipe 36, so that it may perform its intercepting and brake application functions in the event of a break-in-to.

It will be observed that the venting of the brake pipe causes an application of the brakes for either system and for safety purposes the change-over valve includes ports which vent the brake pipe completely as the valve shifts between its two functional positions. This is merely a safety device, making it impossible to charge the brake system through the brake pipe unless the wheel shifting mechanism be moved to one or another of its limiting positions. If the reservoirs are charged at the time of shift, an emergency application will occur on the active set of wheels as they approach in their load supporting position.

The change-over valve shown in Fig. 3 comprises an annular pipe bracket 133 to which all pipe connections are made. To it are connected the pipe 91 which leads from the brake cylinder port of the triple valve, the pipe 88 which is the brake cylinder pipe, an arm of the brake pipe branch 51, the pipe 122 which leads to the space below the diaphragm 125, and a branch of the emergency reservoir pipe 72.

There is also connected to the bracket 133 a pipe 134 which leads from the fitting 135 interposed in the brake pipe 36. Housed in the fitting 135 is a ball check valve 136 opening toward the pipe 134. A housing 137 is bolted to the fitting 135 and has a tubular guide 138 in which is mounted a cup-shaped poppet valve 139. This valve seats at 141 to close an atmospheric port 142 and is urged toward this seat by a coil compression spring 143. When open, the valve 139 connects the brake pipe 36 with atmosphere and it will open if the pipe 134 be vented at a time when the pipe 36 is charged.

After the valve 139 has opened and vented to the pipe 36, it will close under the urge of its spring 143. If the pipe 36 then be charged and the vent from the pipe 134 be closed as normally it is, the pipe 134 will be charged from the brake pipe 36 by flow through the side port 144 formed in the valve 139. In effect, therefore, 139 is simply a brake pipe vent valve which is normally closed and which will open if the pipe 134 be vented while the pipe 36 is charged.

Mounted against the bracket 133 with an intervening sealing gasket is a valve housing 145 and against this with an intervening gasket is mounted a seat portion 146. These parts are held together by bolts not visible in Fig. 3 but indicated in Fig. 5.

At the center of the seat portion 146 is a seat for rotary valve 147 which may be shifted between two limiting positions by a crank arm 148. This arm is fixed on a stem 149 which is journaled in the seat member 146 and carries at its inner end a key 151 which enters between wings on the back of the valve. The gasket 152 prevents leakage and a coil compression spring 153 reacts against the plunger 154 to urge the valve toward its seat.

The limiting positions of the valve are defined by stops 155 and 156 (see Fig. 5). These stops limit the motion of the arm 148.

To avoid unnecessary reference numerals, the ports which communicate with the pipes 91, 88, 51, 122, 72 and 134, since they simply form continuations of the pipes, are given the same reference number.

The branch port 157 connects emergency reservoir pipe 72 with the space behind the rotary valve 147. Hence the valve is held to its seat by this emergency reservoir pressure and by the spring 153.

However, during initial charging brake pipe pressure will for a time exceed emergency reservoir pressure, and acting between the valve and its seat might blow the rotary valve from its seat. To prevent this, a cap 158 is bolted to the housing 145 and clamps the marginal portion of a flexible diaphragm 159. This diaphragm acts through a thrust block 161 on the plunger 154 and is subject on its right hand face (as viewed in Fig. 3) to brake pipe pressure communicated through a branch passage 162. This ensures close seating of the rotary valve at all times.

There is an exhaust port 163 formed in the seat of the rotary valve. As best shown in Figures 6 and 7, the rotary valve is provided with three cavities 168, 169 and 170. On these views the seat ports are shown in dotted lines and are numbered to correspond with the connected pipes above enumerated.

In rail operation position, the cavity 168 connects the brake cylinder pipe 88 with the brake cylinder port connection 91 of the triple valve and the cavity 169 connects the emergency reservoir pipe 72 with the pipe 122 leading to the space below the diaphragm 125. The brake pipe connection 51 is blanked. So are the vent valve connection 134 and the exhaust port 163.

Thus the triple valve is connected in operative relation to the rail wheel brake cylinder and the stand-by emergency valve in housing 120 of the automotive brake is rendered inert because the pressures on opposite sides of the diaphragm 125 are equalized.

In road operation position the connection 91 is blanked and the brake cylinder pipe 88 is connected to the exhaust port 163 by the cavity 168, so that the rail wheel brake cylinder is cut out and vented. The cavity 169 connects the pipe 122 with the brake pipe branch 51 so that the stand-by emergency valve for the automotive brake in housing 120 is conditioned to respond to an emergency reduction of pressure in pipe 36. The emergency reservoir connection 72 is blanked as is the emergency vent connection 134.

As the valve moves between the two extreme positions shown in Figs. 6 and 7, the cavity 170 connects the exhaust port 163 with a vent valve connection 134, ensuring that the brake pipe 36 will be vented as a result of the shift of the change-over valve from one limiting position to the other. It should be observed, however, that this venting connection persists only during the shift and that the port 134 is blanked in both limiting positions.

As has been suggested, the change-over valve preferably is operated by, or as an incident to, the shift of the shiftable set of load supporting wheels. A simple manner of effecting this result is indicated in Fig. 5.

Mounted on the shiftable axle 23 is a bracket 172 and through an aperture in this bracket is guided a rod 173, pinned at 174 to the end of the crank arm 148.

At the two limits of motion in its traverse from active to inactive position and vice versa, the bracket 172 coacts with stops on the rod 173. The lower stop is a member 175 which is adjustable by shifting the lock nuts 176. The buffer spring 177 is interposed to ensure that the arm 148 is held against the stop 155, despite moderate inaccuracies of motion. The upper stop is of similar construction, that is, it comprises a stop member 178 adjustable by nuts 179 and having an interposed spring 181 functionally similar to the spring 177.

Examination of Fig. 5 will indicate that the valve is shifted near the end of the shifting traverse of the axle and causes a venting of the pipe 36, so that the brakes on the active set of wheels tend to apply as the wheels approach active position. In any event, the brake system cannot be charged until the wheel shift is completed.

The operation of the system is believed to be clear in view of the description which has been given above. It should be noted that the triple valve is always connected to the brake pipe and controls charging of both reservoirs. The change-over valve connects and disconnects the triple valve to and from the rail wheel brake cylinder.

The brake controlling valve device for the automotive brake, i. e., the mechanism in housing 101 and 120, is always connected by pipe 119 with the brake cylinder 96. The straight air pipe is connected to nothing during operation on rails and hence is at atmospheric pressure.

The transfer valve controls the stand-by emergency valve by connecting the pipe 122 either to the emergency reservoir, in which event the stand-by emergency valve is inactive, or to the brake pipe, in which event it is conditioned to operate. When it operates, it disconnects the straight air valve mechanism and the straight air pipe from the automotive brake cylinder and admits emergency reservoir air supplemented by auxiliary reservoir air directly to the automotive brake cylinder.

It will be observed that air for straight air braking comes primarily from the emergency reservoir but as pressure in the emergency reservoir is reduced, the system will draw on the auxiliary reservoir and triple valve chamber for air. Thus in straight air braking the triple valve is biased toward release and recharge position.

In its broadest aspects the invention contemplates two complete systems, each with its own brake cylinder, the two systems having in common at least one and preferably two reservoirs and having in common a pipe which serves as the brake pipe for the rail automatic system and as a reservoir pipe for the automotive two-pipe system.

It will be understood that in indicating a self-lapping brake valve for the automotive brake and a hydraulic transmitting mechanism for the automotive brake, the purpose is to suggest possible conformance to present commercial standards without implying the necessary use of either mechanism.

While it is preferred to operate the change-over valve directly by the shifting element which interchanges the wheels, and while I consider this a feature of my invention because it makes the position of the change-over valve strictly dependent on the position of the wheels, I realize that other interconnections or interlocks might be used to entail movement of the change-over valve as an incident to or as the result of shifting of the load bearing wheels. Manual or independent control of the change-over valve is also contemplated.

Hence, except to the extent specified in the claims, the invention is not limited to the details illustrated.

What is claimed is:

1. In a fluid pressure brake system, the combination of two brake applying means each independent of the other and each comprising a brake cylinder; a normally charged brake pipe; at least one reservoir charged from said brake pipe, said reservoir serving to supply air for operating each brake cylinder; two brake controlling valve devices one for each brake cylinder, each capable of response to pressure reductions in said brake pipe to apply its brake by supplying air from the reservoir to the corresponding brake cylinder; and means shiftable to two positions in which, respectively, it renders the brake controlling devices selectively responsive to brake pipe pressure while inhibiting effective response of the other valve device.

2. In a fluid pressure brake system, the combination of two brake applying means each independent of the other and each comprising a brake cylinder; a normally charged brake pipe; at least one reservoir charged from said brake pipe, said reservoir serving to supply air for operating each brake cylinder; two brake controlling valve devices one for each brake cylinder, each capable of response to pressure reductions in said brake pipe to apply its brake by supplying air from the reservoir to the corresponding brake cylinder; means shiftable to two positions in which, respectively, it renders the brake controlling devices selectively responsive to brake pipe pressure while inhibiting the response of the other valve device; a straight air brake applying valve means associated with one of said brake controlling valve devices; and a straight air pipe connected with said straight air brake applying means.

3. In a fluid pressure brake system, the combination of two brake applying means, each independent of the other and each comprising a brake cylinder; a normally charged brake pipe; a pair of reservoirs serving to supply air for operating each of said brake cylinders; two brake controlling valve devices, one for each brake cylinder, the first of said devices comprising a triple valve controlling the charging of said reservoirs, the admission of air therefrom to the corresponding brake cylinder and the exhaust of air therefrom, and the second of said devices comprising a straight air relay valve controlling supply of air from one of said reservoirs to the other brake cylinder and exhaust of air therefrom, together with an automatic standby emergency valve capable of responding to reductions of brake pipe pressure to emit air from at least one of said reservoirs to the corresponding brake cylinder and arranged then to isolate the relay valve from such brake cylinder; a straight air pipe for controlling said relay; and a selector valve shiftable between two positions in one of which it connects the triple valve with its brake cylinder and disconnects the standby valve from the brake pipe, and in the other of which it connects the standby valve with the brake pipe and disconnects the triple valve from its brake cylinder.

4. The combination with the structure defined in claim 3 in which one reservoir serves as an auxiliary reservoir and the other as an emergency reservoir, which latter supplies air to the relay valve, of a one way flow valve for supplying air from the auxiliary to the emergency reservoir, whereby operation of the relay valve tends to reduce auxiliary reservoir pressure and thus stabilize the triple valve in release position.

5. The combination defined in claim 3 in which the standby valve includes a charging valve, through which charging flow may occur from the brake pipe to at least one of said reservoirs.

6. The combination of a structure as defined in claim 3, in which one reservoir serves as an auxiliary reservoir for the triple valve and supplies air for service applications made by the triple valve and the other serves as an emergency reservoir to supplement the auxiliary reservoir in emergency applications made by the triple valve and also as the source of braking air for the straight air relay valve and the standby emergency valve.

7. The combination of a structure as defined in claim 3, in which one reservoir serves as an auxiliary reservoir for the triple valve and supplies air for service applications made by the triple valve and the other serves as an emergency reservoir to supplement the auxiliary reservoir in emergency applications made by the triple valve and also as the source of braking air for the straight air relay valve and the standby emergency valve, and a check valve permitting unidirectional flow from the auxiliary reservoir to the emergency reservoir, when pressure in the latter is reduced below pressure in the former.

8. The combination of a structure as defined in claim 3, in which one reservoir serves as an auxiliary reservoir for the triple valve and supplies air for service applications made by the triple valve and the other serves as an emergency reservoir to supplement the auxiliary reservoir in emergency applications made by the triple valve and also as the source of braking air for the straight air relay valve and the standby emergency valve; a check valve permitting unidirectional flow from the auxiliary reservoir to the emergency reservoir, when pressure in the latter is reduced below pressure in the former; and charging valve means associated with said standby emergency valve and affording when said valve is connected with the brake pipe a distinct charging path leading from brake pipe to emergency reservoir.

9. The combination of a structure as defined in claim 3, in which one reservoir serves as an auxiliary reservoir for the triple valve and supplies air for service applications made by the triple valve and the other serves as an emergency reservoir to supplement the auxiliary reservoir in emergency applications made by the triple valve and also as the source of braking air for the straight air relay valve and the standby emergency valve; and charging valve means associated with said standby emergency valve and affording when said valve is connected with the brake pipe a distinct charging path leading from said brake pipe to emergency reservoir.

10. The combination of a vehicle having a set of road wheels and a set of rail wheels; means for shifting at least one set of wheels to interchange the sets in sustaining relation to the vehicle; two brake-applying means each comprising a brake cylinder for braking a corresponding set of wheels; a normally charged brake pipe on the vehicle; at least one reservoir charged from said brake pipe, said reservoir serving to supply air for operating each brake cylinder; two brake controlling valve devices, one for each brake cylinder, each capable of response to pressure reductions on said brake pipe to apply its brake by supplying air from the reservoir to the corresponding brake cylinder; change-over means shiftable between two positions in which, respectively, it renders the brake controlling valve devices selectively responsive to brake pipe pressure while inhibiting the response of the other brake controlling valve device; and means for shifting said change-over means between its two positions as an incident to operation of said wheel set shifting means.

11. The combination defined in claim 10 in which the means for shifting the change-over means comprises a mechanical actuating connection between it and said wheel set shifting means.

12. The combination defined in claim 10 in which the means for shifting the change-over means is a mechanical actuating connection between it and said wheel set shifting means comprising two shiftable members one connected to the change-over means and the other with the wheel shifting means; stops for limiting motion of the change-over means to define said two positions and a yielding reversely operable driving connection between said shiftable members.

13. The combination defined in claim 10, in which said change-over means includes valve means adapted to vent the brake pipe in a position intermediate said two positions.

14. The combination of a vehicle having a set of road wheels and a set of rail wheels; means for shifting at least one set of wheels to interchange the sets in sustaining relation to the vehicle; two brake-applying means each comprising a brake cylinder for braking a corresponding set of wheels; a normally charged brake pipe on the vehicle; at least one reservoir charged from said brake pipe, said reservoir serving to supply air for operating each brake cylinder; two brake controlling valve devices, one for each brake cylinder, each capable of response to pressure reductions in said brake pipe to apply its brake by supplying air from the reservoir to the corresponding brake cylinder; a straight air valve associated with one of said brake controlling valve devices and adapted to control pressure in its associated brake cylinder by supplying air from said reservoir and exhausting such air; a straight air pipe for controlling said straight air valve; change-over means shiftable between two positions in which, respectively, it renders the brake controlling valve devices selectively responsive to brake pipe pressure while inhibiting the response of the other brake controlling valve device; and means for shifting said change-over means between its two positions as an incident to operation of said wheel set shifting means.

15. A convertible air brake system for vehicles operated in trains on rails and alternatively operated as trailers behind automotive tractors on roads, comprising in combination, a normally charged brake pipe; a normally vented straight air pipe; an auxiliary reservoir; an emergency reservoir; a one-way charging valve permitting flow from the auxiliary reservoir to the emergency reservoir and inhibiting flow in the reverse direction; a rail brake cylinder for controlling the vehicle when operated on rails; an automotive brake cylinder for controlling the vehicle when operated on roads; a triple valve connected to said brake pipe, auxiliary reservoir and rail brake cylinder, said triple valve having a release position in which it opens a charging path from the brake pipe to the auxiliary reservoir and exhausts the rail brake cylinder, a service position in which it connects the auxiliary reservoir with the rail brake cylinder, and an emergency position in which it connects both reservoirs with the rail brake cylinder; a straight air relay valve connected to the straight air pipe to be controlled by pressures established therein, connected to the emergency reservoir to derive braking air therefrom, and connected to the automotive brake cylinder to control braking pressures therein; and an automatic emergency valve associated with said relay valve, said emergency valve including two valves each open when the other is closed, one of said valves being a normally open intercepting valve between the relay valve and the automotive brake cylinder, and the other being a normally closed emergency valve between the emergency reservoir and the automotive brake cylinder, a movable abutment subject on one side to emergency reservoir pressure and subject on its other side to brake pipe pressure, said abutment being connected to shift said valves from their normal positions in response to a reduction of brake pipe pressure, and means biasing said valves to said normal positions.

16. The combination defined in claim 15 in which the triple valve when in release position establishes a charging path from the brake pipe to the emergency reservoir independently of said one-way charging valve.

17. The combination defined in claim 15 in which the triple valve in its release position establishes a charging path from the brake pipe to the emergency reservoir and the emergency valve offers a charging path from the brake pipe to the reservoir, both said charging paths being independent of the path through said one-way charging valve.

18. A convertible air brake system for vehicles operated in trains on rails and alternatively operated as trailers behind automotive tractors on roads, comprising in combination, a normally charged brake pipe; a normally vented straight air pipe; an auxiliary reservoir; an emergency reservoir; a one-way charging valve permitting flow from the auxiliary reservoir to the emergency reservoir and inhibiting flow in the reverse direction; a rail brake cylinder for controlling the vehicle when operated on rails; an automotive brake cylinder for controlling the vehicle when operated on roads; a triple valve connected to said brake pipe, auxiliary reservoir and rail brake cylinder, said triple valve having a release position in which it opens a charging path from the brake pipe to the auxiliary reservoir and exhausts the rail brake cylinder, a service position in which it connects the auxiliary reservoir with the rail brake cylinder, and an emergency position in which it connects both reservoirs with the rail brake cylinder; a straight air relay valve connected to the straight air pipe to be controlled by pressures established therein, connected to the emergency reservoir to derive braking air therefrom, and connected to the automotive brake cylinder to control braking pressures therein; an automatic emergency valve associated with said relay valve, said emergency valve including two valves each open when the other is closed, one of said valves being a normally open intercepting valve between the relay valve and the automotive brake cylinder, and the other being a normally closed emergency valve between the emergency reservoir and the automotive brake cylinder, a movable abutment subject on one side to emergency reservoir pressure and normally subject on the other side to brake pipe pressure, said abutment being connected to shift said valves from their normal positions in response to a reduction of brake pipe pressure, and means biasing said valves to said normal positions; and a change-over valve operable to equalize the pressures on the last named abutment whereby said abutment is rendered ineffective to shift the connected valve from said normal positions.

19. The combination defined in claim 18 in which the change-over valve includes means for venting said brake pipe as an incident to its operation.

20. A convertible air brake system for vehicles operated in trains on rails and alternatively operated as trailers behind automotive tractors on roads, comprising in combination, a normally charged brake pipe; a normally vented straight air pipe; an auxiliary reservoir; an emergency reservoir; a one-way charging valve permitting flow from the auxiliary reservoir to the emergency reservoir and inhibiting flow in the reverse direction; a rail brake cylinder for controlling the vehicle when operated on rails; an automotive brake cylinder for controlling the vehicle when operated on roads; a triple valve connected to said brake pipe auxiliary reservoir and rail brake cylinder, said triple valve having a release position in which it opens a charging path from the brake pipe to the auxiliary reservoir and exhausts the rail brake cylinder, a service position in which it connects the auxiliary reservoir with the rail brake cylinder, and an emergency position in which it connects both reservoirs with the rail brake cylinder; a straight air relay valve connected to the straight air pipe to be controlled by pressures established therein, connected to the emergency reservoir to derive braking air therefrom and connected to the automotive brake cylinder to control braking pressures therein; an automatic emergency valve associated with said relay valve, said emergency valve including two valves, each open when the other is closed, one of said valves being a normally open intercepting valve between the relay valve and the automotive brake cylinder, and the other being a normally closed emergency valve between the emergency reservoir and the automotive brake cylinder, a movable abutment subject on one side to emergency reservoir pressure and normally subject on the other side to brake pipe pressure, said abutment being connected to shift said valves from their normal positions in response to a reduction of brake pipe pressure, and means biasing said valves to their normal positions; and a change-over valve operable to subject both faces of the last named abutment to emergency reservoir pressure whereby the abutment is rendered ineffective to shift its connected valves from said normal positions.

21. A convertible air brake system for vehicles operated in trains on rails and alternatively operated as trailers behind automotive tractors on roads, comprising in combination, a normally charged brake pipe; a normally vented straight air pipe; an auxiliary reservoir; an emergency reservoir; a one-way charging valve permitting flow from the auxiliary reservoir to the emergency reservoir and inhibiting flow in the reverse direction; a rail brake cylinder for controlling the vehicle when operated on rails; an automotive brake cylinder for controlling the vehicle when operated on roads; a triple valve connected to said brake pipe auxiliary reservoir and rail brake cylinder, said triple valve having a release position in which it opens a charging path from the brake pipe to the auxiliary reservoir and exhausts the rail brake cylinder, a service position in which it connects the auxiliary reservoir with the rail brake cylinder, and an emergency position in which it connects both reservoirs with the rail brake cylinder; a straight air relay valve connected to the straight air pipe to be controlled by pressures established therein connected to the emergency reservoir to derive braking air therefrom and connected to the automotive brake cylinder to control braking pressures therein; an automatic emergency valve associated with said relay valve, said emergency valve including two valves each open when the other is closed, one of said valve mechanisms being a normally open intercepting valve between the relay valve and the automotive brake cylinder, and the other being a normally closed emergency valve between the emergency reservoir and the automotive brake cylinder, a movable abutment subject on one side to emergency reservoir pressure and normally subject on the other side to brake pipe pressure, said abutment being connected to shift said valves from their normal positions in response to a reduction of brake pipe pressure, and means biasing said valves to said normal positions; and a change-over valve operable to subject both faces of the last named abutment to emergency reservoir pressure and to disconnect said rail brake cylinder from said triple valve.

CHARLES A. CAMPBELL.